United States Patent [19]

Kreissl et al.

[11] 4,394,582
[45] Jul. 19, 1983

[54] METHOD AND APPARATUS FOR UTILIZING THE WASTE HEAT ENERGY OF AN INTERNAL COMBUSTION ENGINE

[75] Inventors: Ottmar Kreissl, Karlsfeld; Josef Schurrer, Deisenhofen; Karl Mötz, Munich; Wilhelm Leitgeb, Bad Neustadt, all of Fed. Rep. of Germany; Heinz Rosenberg, Vienna, Austria

[73] Assignees: M.A.N.-Dachauer, Munich; Siemens, Erlangen, both of Fed. Rep. of Germany

[21] Appl. No.: 319,666

[22] Filed: Nov. 9, 1981

Related U.S. Application Data

[63] Continuation-in-part of Ser. No. 256,818, Apr. 23, 1981, abandoned.

[30] Foreign Application Priority Data

Apr. 28, 1980 [DE] Fed. Rep. of Germany ....... 3016330
Aug. 9, 1980 [DE] Fed. Rep. of Germany ....... 3030232

[51] Int. Cl.³ ............................................. F01K 23/10
[52] U.S. Cl. ...................................... 290/4 C; 290/2; 290/52; 60/618

[58] Field of Search ................... 290/52, 2, 4 B, 4 D, 290/4 C; 60/618, 624; 310/156

[56] References Cited

U.S. PATENT DOCUMENTS

| | | | |
|---|---|---|---|
| 2,511,854 | 6/1950 | Kane | 290/52 |
| 3,243,621 | 3/1966 | Wesolowski | 290/52 |
| 3,948,053 | 4/1976 | Gamell | 60/618 |
| 4,219,752 | 8/1980 | Katou | 310/156 |
| 4,253,031 | 2/1981 | Frister | 290/52 |

Primary Examiner—J. V. Truhe
Assistant Examiner—Shelley Wade
Attorney, Agent, or Firm—Posnack, Roberts, Cohen & Spiecens

[57] ABSTRACT

A method and apparatus for utilizing the waste heat energy of an internal combustion engine in which a turbine is driven by the exhaust gases from the engine and drives an electrical generator. In order to permit a direct coupling between the turbine and the generator and to utilize completely the electrical energy recoverable from the waste heat energy, the generator is a synchronous machine with a non-wound rotor, the generator being connected via an electrical converter to an electric motor which is drivingly coupled to the internal combustion engine to relieve the load therein.

23 Claims, 3 Drawing Figures

METHOD AND APPARATUS FOR UTILIZING THE WASTE HEAT ENERGY OF AN INTERNAL COMBUSTION ENGINE

CROSS-RELATED APPLICATION

This application is a continuation-in-part of Ser. No. 256,818 filed Apr. 23, 1981, now abandoned.

FIELD OF THE INVENTION

The present invention relates to a method and apparatus for utilizing the waste heat energy of an internal combustion engine in which a thermodynamic expansion machine, the operating fluid of which is heated by the waste heat energy of the internal combustion engine and is separated physically from the exhaust gases of the internal combustion machine, drives an electrical power generator to produce electrical current.

PRIOR ART

One such method is known from West German Unexamined patent application OS No. 26 18 584. In this method, steam is produced by means of the waste heat energy of an internal combustion engine, the steam being expanded in a steam turbine or a steam engine coupled to a generator. Furthermore, in the known method it is proposed to have the steam engine also apply input to the shaft of the internal combustion engine. Such a coupling of the steam engine back to the internal combustion engine, as a rule, requires an adaptor transmission due to the different speeds of rotation of the two types of machines. Further difficulties occur when the internal combustion machine is itself operated at different speeds of rotation as is the case in internal combustion engines installed in vehicles. If the steam engine only drives a generator then, for a stationary internal combustion engine there are no difficulties in feeding the electrical energy obtained by the generator into an output circuit. On the other hand, if the waste heat of a movably arranged internal combustion engine is to be utilized, considerable problems arise with respect to the further use of the recoverable electrical energy.

At a relatively low power of production such as for automobile internal combustion engines, small turbines of very high speeds of rotation must be used in order to obtain good efficiency. Since conventional electrical machines having a wound rotor can not be operated at the customary high speeds of rotation of turbines of relatively small power output, for example, 120,000 rpm, difficulties arise with respect to the coupling of such a generator to such a turbine. The generator can be connected to the turbine via a transmission which reduces the speed of rotation of the turbine to a speed which is permissible for the generator. Due to the high speed of rotation of the turbine, such a transmission requires very high precision in manufacture and, in addition, produces mechanical losses. In order to avoid this expense, the possibility of direct coupling of the generator to the turbine can be contemplated. As a result of the fact that the speed of rotation of a generator having a wound rotor is limited due to considerations of strength, direct coupling is possible only with a correspondingly reduced speed of rotation of the turbine. However, since the efficiency of a turbine decreases rapidly for substantial reduction of its speed of rotation below the optimum operating speed, the yield of the waste-heat energy decreases greatly in the same proportion.

SUMMARY OF THE INVENTION

An object of the present invention is to provide a method and apparatus in which direct coupling of the thermodynamic expansion engine to the electric generator is effected without reduction of the speed of rotation, without great structural expense and in which furthermore electrical energy obtained from the waste heat energy can always be fully utilized also without great technical expense, particularly in the case of an internal combustion machine which operates in fixed or movable condition.

The above and other objects are achieved, in accordance with the invention, by the use of a generator, as a synchronous machine with a non-wound rotor and at least one electrical converter connected after the synchronous machine and at least one electrical motor connected to said one electrical converter and applying input power to said internal combustion engine. The non-wound rotor of the synchronous machine can be constructed in such a manner with respect to its mechanical strength that no reduction in speed of rotation is necessary even with direct coupling with the expansion machine. The expansion machine can therefore operate at its optimum speed. The rotor may be either a so-called external rotor which supports permanent magnets instead of the customary excitation winding or it may be constructed as the rotor of a homopolar reluctance machine. Such a machine, whose electrical or permanent magnetic excitation as well as the operating winding is arranged in the stator, may contain a rotor which consists only of solid-iron shaped elements connected with the shaft and thereby capable of withstanding the stresses at extremely high speeds of rotation. By means of the electrical converter, the voltage produced by the synchronous machine is adapted in respect of its magnitude and/or frequency to the specific requirements of the associated motor.

The invention therefore makes it possible to optimize the utilization of the energy of the waste heat by operating the turbine in its region of maximum efficiency and transmitting the mechanical energy produced by the turbine to the electrical generator and converting the mechanical energy into electrical energy with the smallest possible windage losses. The utilization of the electrical energy is always assured by relieving the load of the internal combustion engine load by feedback from one or more electrical motors driven from the generator.

Due to its high operating speed, the synchronous generator can be made smaller and lighter than a machine with a wound rotor which is limited in its speed of rotation. Furthermore, the elimination of a transmission achieves a further saving of space and weight. As a result, the invention enables the use of a substantially smaller and lighter system as compared to the known systems operating with intermediate transmissions, thereby assuring optimum adaptation for use in vehicles along with the robustness of a synchronous machine having a non-wound rotor.

Another advantage of the invention is that it provides a strong connection or a one-piece shaft between turbine and generator with optimum utilization of the turbine and no additional loads can be imposed on the shaft bearings because of possible inaccurate alignment of the two shafts.

The synchronous machine, when constructed as a homopolar machine, can be excited electrically and the excitation be used, if needed, for voltage regulation. A part of the electrical energy recovered from the waste heat can be used as a source of energy for the excitation.

The excitation of the synchronous machine can, however, also be effected by permanent magnets as a result of which, due to the elimination of energy losses, the efficiency is improved and the removal of heat from the machine is facilitated.

If the electrical energy produced is to be utilized for DC supply, then at least a part of the output of the synchronous generator can be fed to the electrical converter which can be a rectifier. In order to adapt the DC voltage to a value required by DC mains, the rectifier is constructed so that it can be, at least partically controlled, by a small DC regulator.

In accordance with a further feature of the invention, a buffer battery is connected in parallel to the consumer line in the DC circuit. The buffer battery can serve for starting the internal combustion engine or for supplying electrical energy to the consumer line, at least temporarily, for example, when the internal combustion engine is at rest. In this way, the customary dynamo in a vehicle can be replaced by the method of the invention.

However, the invention also contemplates rectifying the entire output from the synchronous machine by means of a rectifier and using the output to drive one or more DC motors which supply input power to the internal combustion engine and thereby relieve the load thereon. For this purpose, the DC motor or motors are adapted to the instantaneous speed of rotation of the internal combustion engine by regulation of their excitation and/or their terminal voltage.

Instead of a DC motor a stronger and less expensive asynchronous or synchronous motor can also be used for the mechanical relief of the load on the internal combustion engine. This is possible due to the fact that the entire power available at each instant from the synchronous generator is used, via the converter, for feeding corresponding AC motors. The operating frequency of the AC motor, which corresponds instantaneously to the speed of rotation of the internal combustion engine, is obtained by the converter, which can be an intermediate-circuit or a direct converter. The converter can also adapt the instantaneous voltage fed to the AC motor to the frequency or speed thereof.

DETAILED DESCRIPTION

Figure 1:
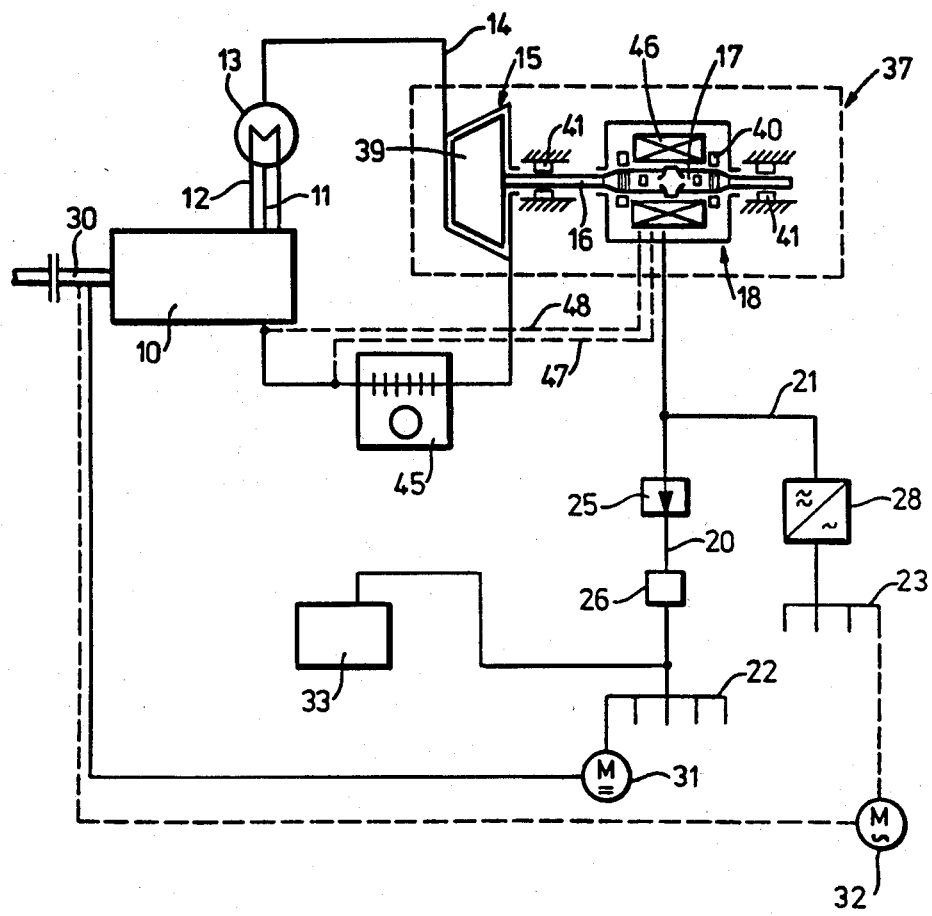
FIG. 1 diagrammatically shows apparatus for utilization of the waste heat energy of an internal combustion engine according to the invention.
Figure 3:
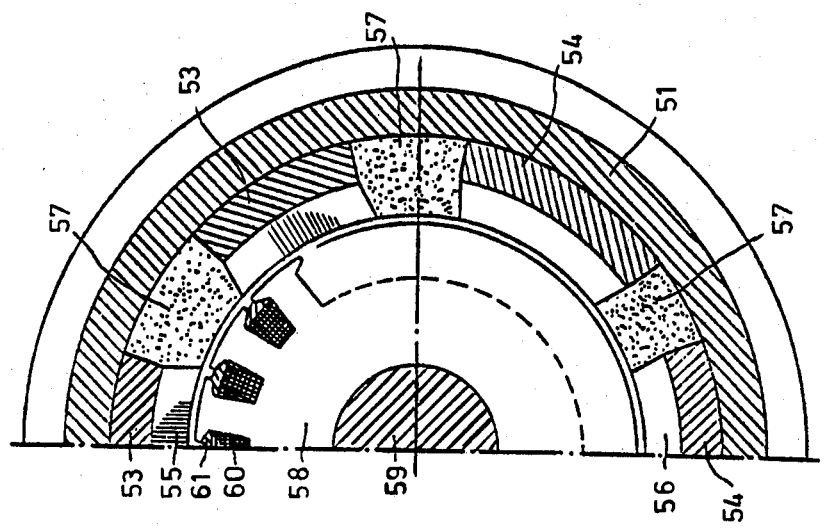
FIG. 3 is a transverse cross-sectional view through the machine in FIG. 2.

Referring to FIG. 1, heated cooling water 11 flowing from an internal combustion engine 10 is evaporated in an evaporator 13 by the exhaust gases 12 from the engine. The exhaust gases 12 and the cooling water 11 being fully separated. Steam 14 produced in evaporator 13 drives a thermodynamic expansion machine 15 constituted as a turbine which is connected via a shaft 16 with a non-wound rotor 17 of a synchronous machine 18 which operates as a generator and by which a major portion of the thermal energy contained in the cooling water 11 and the exhaust gases 12 is converted into electrical energy.

The generator output is supplied to a DC circuit 20 and/or an AC circuit 21 for associated DC mains 22 and AC mains 23 respectively. The rectification of the AC voltage produced by the synchronous generator 18 is effected by a rectifier 25 followed by a DC regulator 26 for adapting the current to the specific requirement. The branched AC circuit 21 includes a frequency converter 28 constructed as a direct converter or an intermediate-circuit converter for adapting the AC voltage to the AC mains 23.

An electrical motor means is provided for converting the electrical energy into mechanical energy which is supplied to the drive shaft 30 of the internal combustion engine 10 in order to save primary energy. The motor means can be a DC motor 31 which is connected to the DC circuit 20 or an AC motor constructed as an asynchronous or synchronous motor.

In order to be able to meet the demand for electrical power at the DC mains even when the internal combustion engine 10 is not operating, a battery 33 is connected in the DC circuit 20 in parallel with the mains 22.

The expansion machine 15 and the synchronous generator 18 are combined into a compact structural unit 37 by a common one-piece shaft 16, one end of which carries the impeller wheel 39 of the expansion machine 15 and the other end of which carries the rotor 17 of the synchronous generator 18. In order to reduce windage losses of the rotor 17 which are considerable in view of the high speed of rotation, a vacuum is produced within the stator cavity of the synchronous generator 18. The vacuum is maintained by labyrinth seals 40 arranged at the ends of the rotor 17, said seals 40 also preventing penetration of particles or foreign substances into the generator. In this way there is complete freedom in the selection of bearings 41 for the shaft 16. The use of oil-lubricated bearings, therefore, poses no problems.

A portion of the coolant which has been condensed and further cooled in a condenser 45 can advantageously be diverted through the stator 46 of the synchronous generator 18 to cool the same and be returned to the coolant going to the internal combustion engine 10. The diversion circuit is shown by dotted lines 47 and 48.

A homopolar machine is particularly well suited for coupling with the expansion machine 15. While such a homopolar machine, due to the construction of its rotor, can be designed for very high speeds of rotation, the space required by it is greater due to its principle of operation as compared to an alternating pole machine of the same power and speed of rotation. A synchronous generator which is particularly suitable for high speeds of rotation is characterized by a construction comprising an alternating pole machine with an external rotor.

Figure 2:
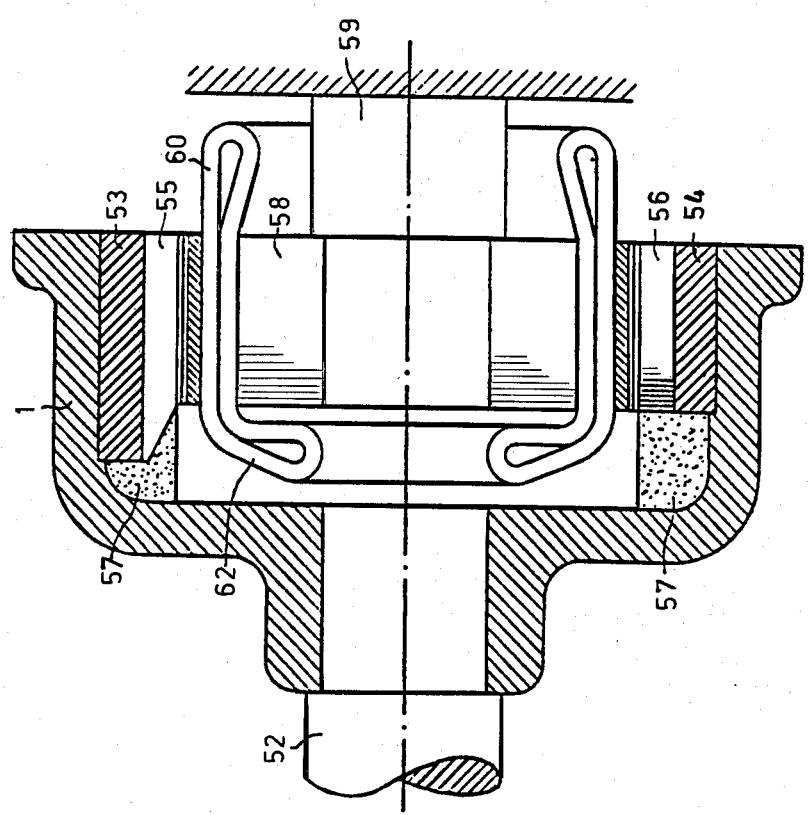
FIG. 2 is an elevational view in longitudinal section, of a six-pole synchronous machine having a bell-shaped outer rotor within which are dish-shaped permanent magnets with laminated pole pieces, the upper and lower halves of the section showing different embodiments of the pole pieces and the permanent magnets.

In the synchronous machine 18 shown in FIG. 2, a bell-shaped iron part 51 of the rotor forms the magnetic flux yoke and is cantilevered on the shaft end 52 of expansion machine 15. Mounted on the inner side of part 51 are cup-shaped permanent magnets 53 (upper half of the section) and 54 (lower half) which are magnetized radially with alternating polarity. The magnets include associated laminated pole pieces 55 and 56. In order to minimize windage losses and at least partially to secure the permanent magnets 53 and 54 and the pole pieces 55 and 56 respectively, intervening spaces are filled with a preferably elastic potting composition 57 such that the inner surface of the rotor forms a smooth hollow cylinder.

The centrifugal forces of the permanent magnets, the pole pieces and the potting composition are resisted by the part 51, which enables high speed operation. In order to make the mechanical stresses and elongation of the part 51 uniform, its wall is strengthened at the opening.

The stator consists of a laminated core 58 seated on a stationary mandrel 59 and carries a stator winding 60 anchored in slots by wedges 61. The ends 62 of the winding which face the drive side are bent radially inward in order to minimize their overhang and thus the axial length of the part 51.

The permanent magnets 53 (upper half of the section) are longer axially than the core 58. The associated axially, parallel laminated pole pieces 55 concentrate the flux from the permanent magnets to the core 58. In the lower half of the section, the pole pieces 56 are laminated normal to the axis and extend, in the same way as the corresponding permanent magnets 54, only over the length of the core 58 but can, however, also achieve a concentration of flux. Furthermore, by the use of metallic and therefore electrically conductive magnets with laminated pole pieces, surface losses caused by the stator slots will be reduced to a fraction of the value that would result without pole pieces.

The invention provides a construction which is particularly compact in the axial direction which is very advantageous at high speed of rotation. There is furthermore obtained a strong, operationally reliable construction which is relatively inexpensive.

What is claimed is:

1. A method for utilizing the waste heat energy of an internal combustion engine, said method comprising driving a thermodynamic expansion machine by waste heat from an internal combustion engine, directly driving from said thermodynamic expansion machine, a synchronous machine having a non-wound rotor as an electrical power generator, connecting at least one electrical converter to the output of said generator, the rotational speed of the generator being the same as the expansion machine, driving an electric motor from said generator and delivering output from said motor to said engine to relieve the load thereon.

2. A method as claimed in claim 1 comprising utilizing a homopolar machine as said synchronous machine.

3. A method as claimed in claim 1 or 2 comprising energizing said generator electrically.

4. A method as claimed in claim 3 comprising effecting voltage control by the excitation of the generator.

5. A method as claimed in claim 1 or 2 comprising exciting the generator by permanent magnets.

6. A method as claimed in claim 1 comprising rectifying at least a portion of the output of the generator to provide direct current.

7. A method as claimed in claim 6 comprising at least partially controlling the rectification of the output of the generator to provide a DC voltage of given value.

8. A method as claimed in claim 1 comprising non-controllably rectifying the output of the generator and adapting the resulting direct voltage to a predetermined value by DC regulation.

9. A method as claimed in claim 7 or 8 comprising buffering the output of the generator by connecting a battery in parallel with the output.

10. A method as claimed in claim 7 or 8 wherein said electric motor is a DC motor which is supplied with at least a portion of the DC output of said generator and which supplies driving force to the internal combustion engine.

11. A method as claimed in claim 1 wherein said electric motor is an AC motor which is supplied with at least a portion of the generator output via a converter, and which supplies driving force to the internal combustion engine.

12. A method as claimed in claim 1 wherein said electric motor is a DC motor which is supplied with at least a portion of the generator output via a converter, and which supplies driving force to the internal combustion engine.

13. A method as claimed in claim 11 or 12 wherein said synchronous generator is adapted for producing a voltage correlated with respect to said converter and with the operation of said motor.

14. A method as claimed in claim 11 wherein the converter adjusts the frequency of the voltage output of the generator to the rating of the AC motor.

15. Apparatus for utilizing the waste heat energy of an internal combustion engine comprising a thermodynamic expansion machine driven by waste heat from an internal combustion engine, electrical generator means drivingly coupled to the expansion machine, said electrical generator means comprising a synchronous generator including a non-wound rotor, electrical converter means connected to said generator and electrical motor means connected to said converter means and drivingly coupled to said internal combustion engine for relieving the load thereon.

16. Apparatus as claimed in claim 15 comprising a common drive shaft coupling said expansion machine and said generator.

17. Apparatus as claimed in claim 16 comprising means for establishing a negative pressure in said rotor of the generator.

18. Apparatus as claimed in claim 17 wherein said rotor has opposite ends, said apparatus further comprising labyrinth seal means at the rotor ends for sealing the rotor.

19. Apparatus as claimed in claim 15 wherein said generator includes a stator, said apparatus further comprising a coolant circuit connecting the internal combustion engine and the stator of the generator for cooling said stator.

20. Apparatus as claimed in claim 15 wherein said electrical generator means comprises an alternating pole machine including an outer rotor and permanent magnets exciting said rotor.

21. Apparatus as claimed in claim 20 wherein said rotor includes a rotor shaft and a bell-like body connected in cantilever fashion to said shaft.

22. Apparatus as claimed in claim 20 wherein said permanent magnets include laminated pole pieces.

23. Apparatus as claimed in claim 21 wherein said machine includes a stator winding having ends closer to said expansion machine bent radially inwards towards said shaft.

* * * * *